Patented Oct. 7, 1941

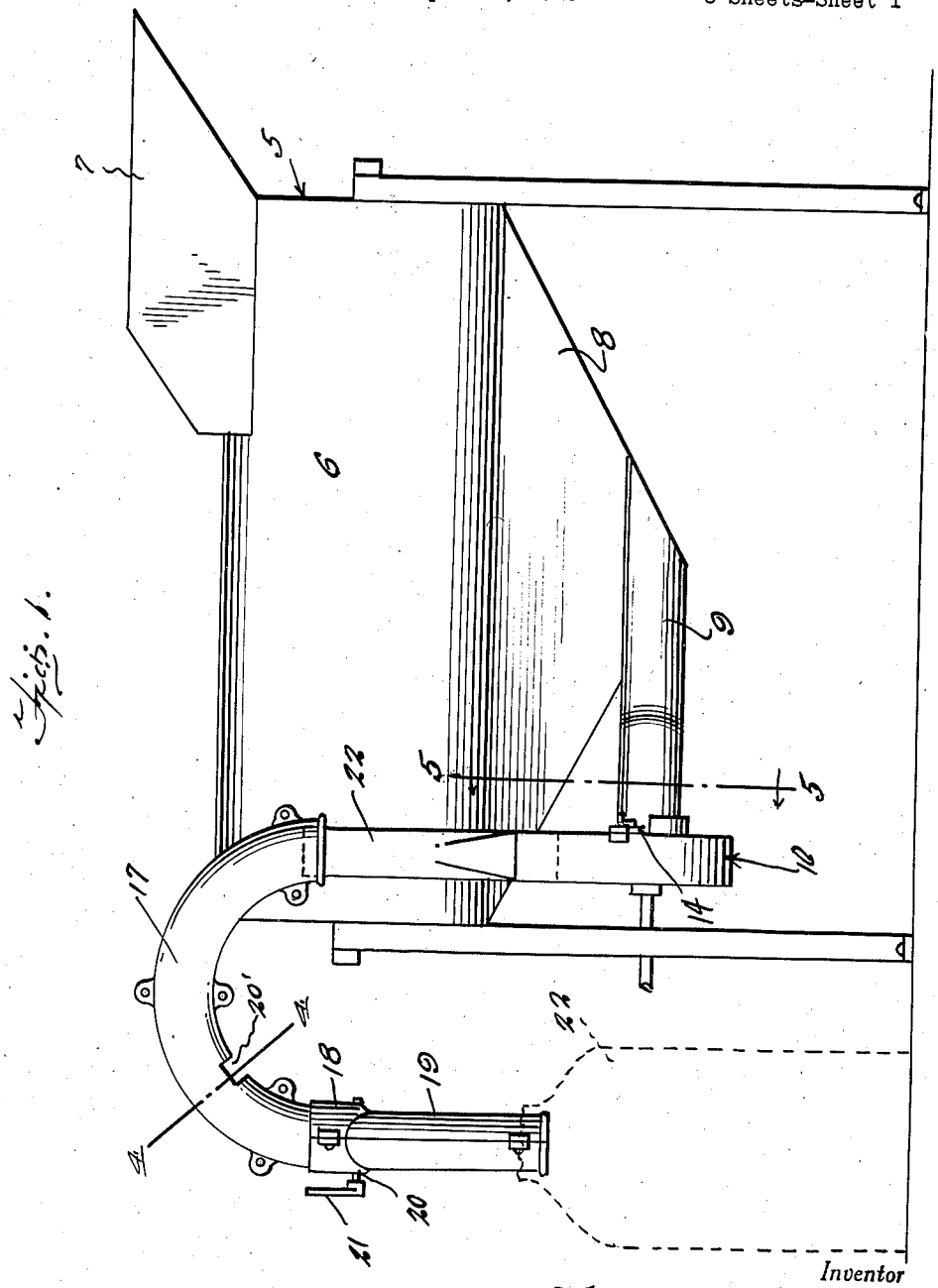

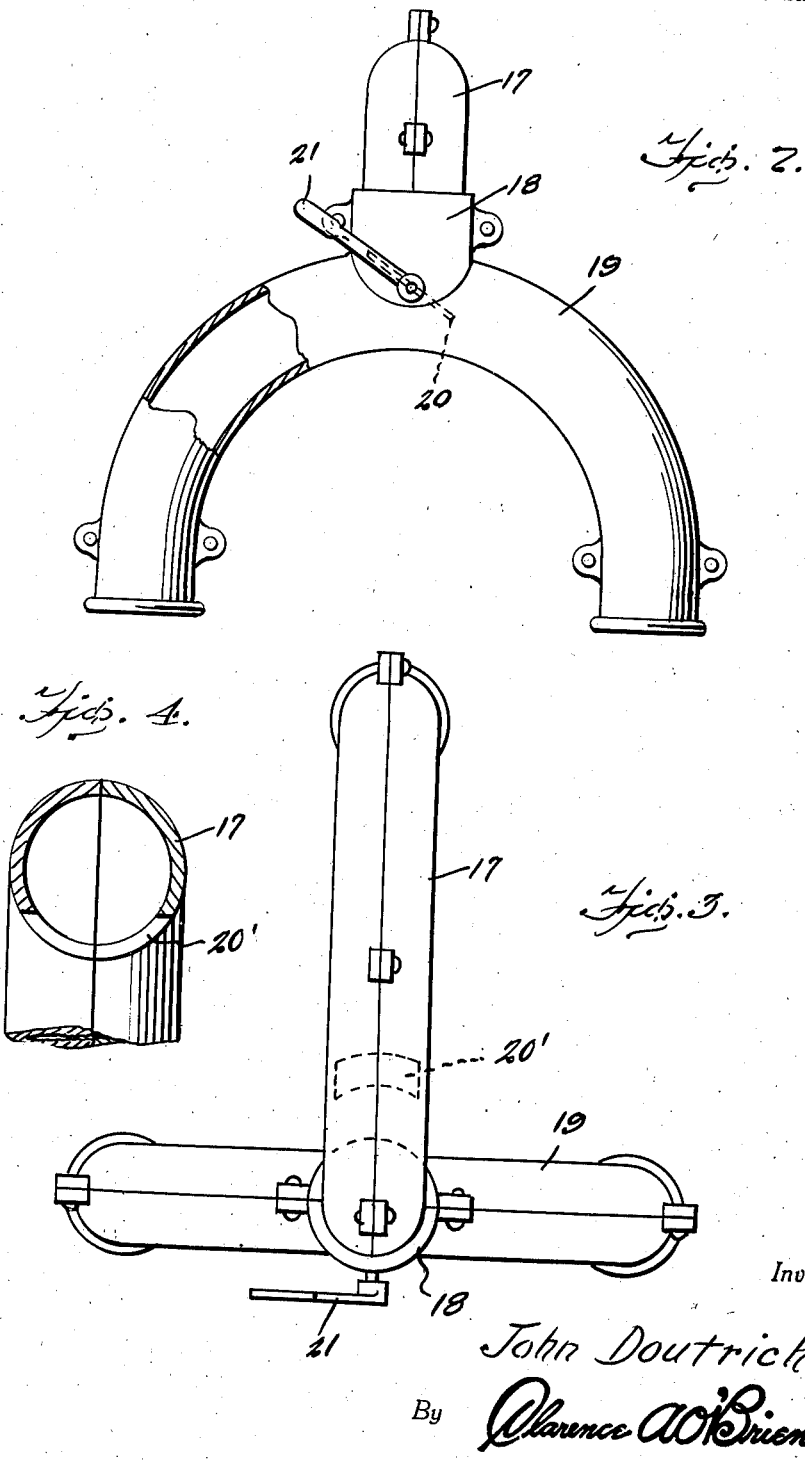

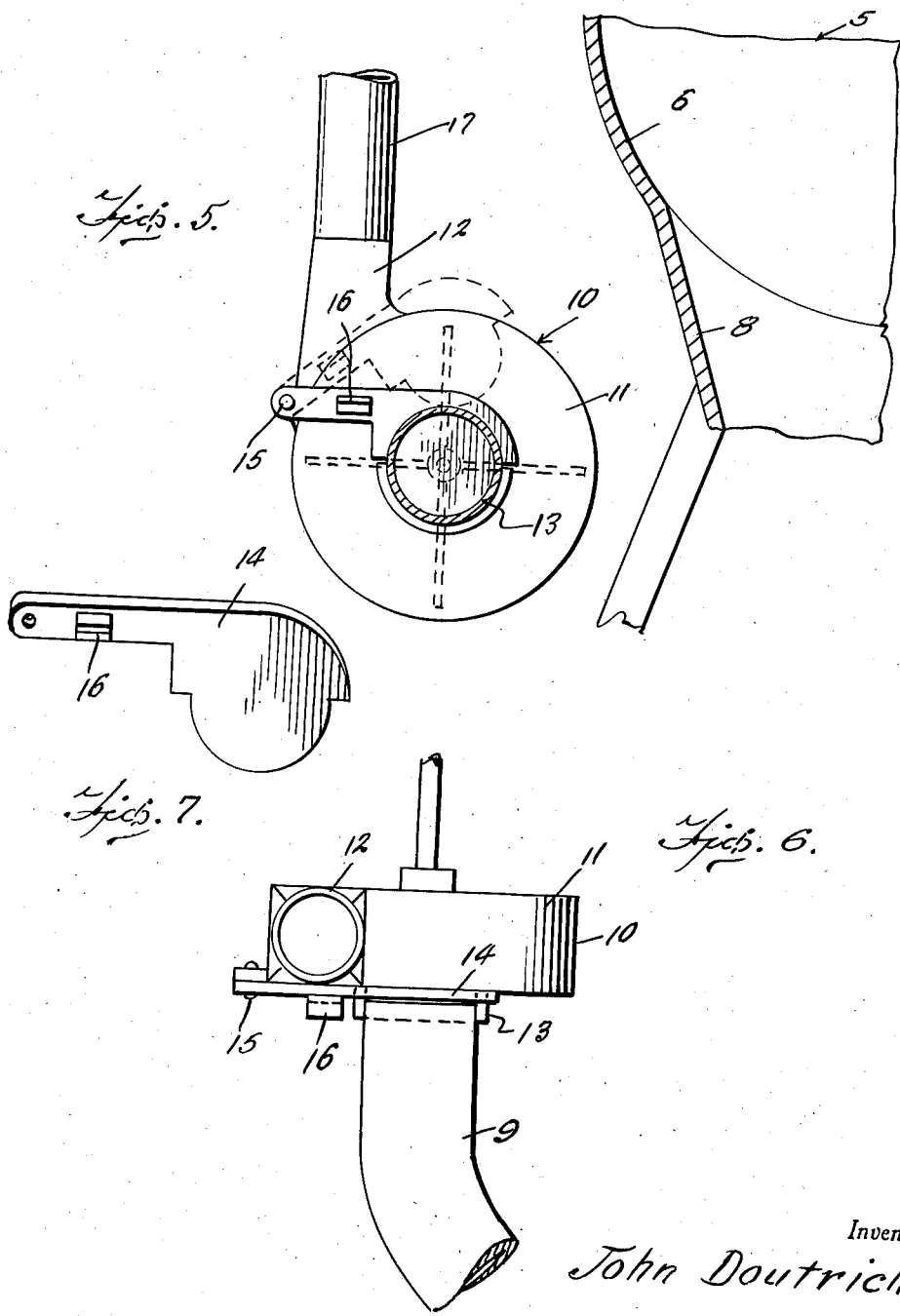

2,258,548

UNITED STATES PATENT OFFICE 2,258,548

COMBINED ELEVATOR AND BAGGING DEVICE FOR CORN SHELLING MACHINES

John Doutrich, Lancaster, Pa., assignor to Dellinger Manufacturing Company, Lancaster, Pa.

Application April 6, 1940, Serial No. 328,381

1 Claim. (Cl. 226—61)

This invention relates to a combined elevator and bagging device for corn shelling machines, and has for the primary object the provision of a device of this character which includes in its construction a pneumatic discharge means for corn and other materials from the shelling cylinder of the corn shelling machine and a gooseneck connected thereto and located in a plane thereabove and having discharge nozzles adapted to be alternatingly employed for filling bags or sacks with the shelled corn and which permits the operator to have time to remove a filled bag and replace another thereon while the bag receiving the corn is being filled.

Another object of this invention is the provision of an overflow in the goose-neck through which shelled corn may escape when a bag becomes full and the operator fails to change the discharge of corn to the other bag and thereby prevent the shelled corn from backing up in the pneumatic discharge means and clogging the latter.

A further object of this invention is the provision of a cut-off to close the shelling cylinder to the pneumatic discharge means whenever the operation of the machine is discontinued or stopped and which will prevent clogging of said pneumatic discharge means with shelled corn before it may reach its full capacity of discharging corn on the starting of the machine after a period of idleness.

With these and other objects in view, the invention consists in certain novel features of construction, combination and arrangement of parts to be hereinafter more fully described and claimed.

For a complete understanding of my invention, reference is to be had to the following description and accompanying drawings, in which Figure 1 is a side elevation illustrating a corn shelling machine equipped with a combined elevator and bagging device constructed in accordance with my invention.

Figure 2 is an end elevation, partly in section, of the combined elevator and bagging device.

Figure 3 is a top plan view illustrating the device.

Figure 4 is a transverse sectional view taken on the line 4—4 of Figure 1.

Figure 5 is a transverse sectional view taken on the line 5—5 of Figure 1, illustrating a control or gate for the pneumatic discharge means forming a part of the present invention.

Figure 6 is a fragmentary top plan view, partly in section, of the pneumatic discharge means.

Figure 7 is a perspective view of the gate or control.

Referring in detail to the drawings, the numeral 5 indicates a well known type of corn shelling machine in which the main shelling cylinder thereof is indicated by the character 6 fed by way of a hopper 7. The lower portion of the shelling machine is in the form of a discharge trough 8 that has direct communication with the shelling cylinder to receive the shelled corn therefrom and discharge it into an outlet pipe or conduit 9.

The present invention is connected to the discharge pipe or conduit 9 and consists of a power driven blower or fan 10 in which the casing is indicated by the character 11, and has a discharge neck 12 and an inlet neck 13 connected to the conduit 9. The discharge neck 12 is disposed vertically. A slot is provided in the inlet neck 13 through which a pivoted gate 14 may be moved for closing the fan casing to the conduit 9 when desired. Just before the machine is stopped in its operation of shelling it is preferable that the gate be moved into a position of closing the conduit 9 to the fan casing to prevent corn from entering the fan casing and permit what corn that may be therein to be discharged before the complete stopping of the machine so that on the machine again being started the fan or blower will be free of corn and may reach its full capacity of operation before corn is again admitted thereto. This prevents clogging of the blower or fan. The gate 14 is pivotally mounted on the fan casing 11, as shown at 15, and may be provided with a finger piece 16 to permit the operator to readily move the gate into a closed or open position.

A goose-neck shaped conduit 17 has one end connected to the discharge neck 12 and its opposite end is connected to a fitting 18 formed on a substantially U-shaped conduit 19 which provides a double discharge nozzle. A gate valve 20 is arranged in the fitting 18 whereby the discharge of corn may be made through either of the discharge nozzles and is provided with a suitable operating handle 21.

The goose-neck shaped conduit 17 adjacent its connection with the fitting 18 is provided with an overflow opening 20' in its lower curved wall. A suitable catch receptacle or basin (not shown) may be arranged under the opening 20'.

In operation, it is to be understood that sacks or bags, as indicated by the character 22 are to be connected with the discharge nozzle and through the operation of the gate valve 20 corn from the shelling machine may be directed into either of said bags. This arrangement will permit the filling of one bag while another bag is being adjusted to the device.

Prior to starting the machine in operation, the gate valve 14 is closed or has been left closed after the stopping of the machine from a prior shelling operation so that all corn will be discharged from the fan or blower before the machine comes to a complete stop. On the starting of the machine for the second time the control gate is left in a closed position until the blower or fan reaches its full capacity of operation. The gate valve is then opened and the shelled corn is drawn by the fan or blower from the conduit 9 and elevated through the goose-neck shaped conduit 17 and flows into the discharge conduit 19. The corn traveling through the goose-neck shaped conduit will follow along the outer wall due to the action of the blower and will pass the opening 20' without falling therethrough. However, should a bag become full before the gate valve is closed by the operator whatever corn that may back up into the goose-neck shaped conduit will leave the latter by way of the opening 20' and be prevented from returning to the fan or blower, consequently obviating any possibility of the returned corn reaching the fan or blower and clogging the latter.

It is believed that the foregoing description, when taken in connection with the drawings, will fully set forth the construction and advantages of this invention to those skilled in the art to which such a device relates, so that further detailed description will not be required.

Having thus described the invention, what I claim is:

In a bagging device for corn shelling machines, a goose-neck shaped conduit having a relatively fixed position with the ends thereof directed downwardly and both located in a horizontal plane and having one end connected to a corn shelling machine discharge whereby corn under pressure may be driven through said conduit following the upper curved wall of the conduit, a substantially U-shaped conduit including an inlet fitting intermediate the ends thereof and connected to the other end of the first-named conduit whereby the ends of the second-named conduit act as spaced discharge nozzles to enter bags, valve means for directing corn to one or the other of said nozzles, said first-mentioned conduit having an opening in the lower curved wall to permit corn to exhaust therefrom should the escape of corn from both nozzles be stopped by the bag of one nozzle becoming full and the operator failing to actuate said valve for the directing of the corn to the other nozzle and the bag associated therewith.

JOHN DOUTRICH.